United States Patent Office 3,130,047
Patented Apr. 21, 1964

3,130,047
PRESENSITIZED PRINTING PLATES COMPRISING NAPHTHOQUINONE - 1,2 - DIAZIDE REPRODUCTION LAYERS
Fritz Uhlig, Wilhelm Neugebauer and Oskar Süs, all of Wiesbaden-Biebrich, and Gerhard Fritz, Wiesbaden, Germany, assignors, by mesne assignments, to Azoplate Corporation, Murray Hill, N.J.
No Drawing. Filed Jan. 11, 1960, Ser. No. 1,420
Claims priority, application Germany Jan. 15, 1959
36 Claims. (Cl. 96—33)

The present invention relates to novel reproduction layers for use as components of printing plates, the layers comprising at least one light-sensitive esterification product of a naphthoquinone-(1,2)-diazide sulfonic acid and benzene derivatives which are substituted by at least two hydroxyl groups; the benzene component of the ester contains at least one free hydroxyl group and may also contain, in addition, halogen, alkyl or alkoxy radicals. If desired, the reproduction layer may also contain alkali soluble resins.

It is known to the art to manufacture printing plates in which one side of the printing plate is coated with a reproduction layer containing, as the light-sensitive substance, a naphthoquinone-(1,2)-diazide sulfoester.

The light-sensitive esters of the present invention are prepared by the reaction of the naphthoquinone-(1,2)-diazide-sulfonic acids, preferably in the form of their sulfochlorides, with benzene derivatives having at least two hydroxyl groups.

Among the naphthoquinone-(1,2)-diazidesulfoesters to be used in accordance with the present invention, the derivatives of naphthoquinone-(1,2)-diazide-(2)-sulfonic acid-(5) and of naphthoquinone-(1,2)-diazide-(2)-sulfonic acid-(4) are preferred, but the esters of other naphthoquinone-(1,2)-diazide sulfonic acids, such as naphthoquinone-(1,2)-diazide-(1)-sulfonic acid-(5),
naphthoquinone-(1,2)-diazide-(1)-sulfonic acid-(4),
naphthoquinone-(1,2)-diazide-(1)-sulfonic acid-(6),
naphthoquinone-(1,2)-diazide-(1)-sulfonic acid-(7),
and naphthoquinone-(1,2)-diazide-(1)-sulfonic acid-(2), may also be used.

As examples of benzene derivatives which are substituted by at least two hydroxyl groups and may contain other substituents, in addition to these hydroxyl groups, e.g. halogen, such as fluorine, bromine, and chlorine, and/or lower alkyl radicals, such as methyl, ethyl propyl, and butyl radicals, and/or lower alkoxy radicals, such as methoxy, ethoxy, propoxy or butoxy radicals, the following compounds are listed:

1,2-dihydroxy-benzene;
1,3-dihydroxy-benzene;
1,4-dihydroxy-benzene;
1,2,3-trihydroxy-benzene;
1,2,4-trihydroxy-benzene;
1,3,5-trihydroxy-benzene;
1,2,3,4-tetrahydroxy-benzene;
1,2,4,5-tetrahydoxy-benzene;
1,2,4,6-tetrahydroxy-benzene;
pentahydroxy-benzene;
hexahydroxy-benzene;
1,3-dihydroxy-(4)-ethylbenzene;
1,3-dihydroxy-(5)-methylbenzene;
1,3-dihydroxy-(5)-ethoxybenzene;
1,3-dihydroxy-(4,6)-dichlorobenzene;
2,4-dihydroxy-1-methoxy-benzene;
4-chloro-1,3-dihydroxybenzene;
4-iodine-1,3-dihydroxybenzene;
4-bromo-1,3-dihydroxy-benzene;
2,5-dihydroxy-1-methylbenzene;
2,6-dihydroxy-1-methylbenzene;
1,3-dihydroxy-2-methoxybenzene;
2,3-dihydroxy-1-methoxybenzene;
4,6-dihydroxy-2-methyl-1-acetoxybenzene;
4,6-dihydroxy-3-acetoxybenzene.

Preferably, the di- and trihydroxy-benzenes and their substitution products are used.

For the preparation of the esters the two components, of which the sulfonic acids are usually applied in the form of their sulfochlorides, are generally dissolved in a solvent, such as dioxane or tetrahydrofurane, and then esterified by adding an acid-binding agent, such as alkali bicarbonates, alkali carbonates or other weak alkalies, or amines preferably tertiary amines such as pyridine. In order to avoid formation of a dyestuff, only such quantities of the acid-binding agent are added as to render the reaction mixture neutral or weakly alkaline. For separation of the reaction product, it is reprecipitated from the reaction mixture by the addition of water or preferably dilute hydrochloric acid, filtered by suction, and dried. In most cases, the sulfoesters thus obtained can immediately be used for the preparation of light sensitive reproduction layers. They may, however, be further purified by dissolving them in a suitable solvent, e.g. dioxane, tetrahydrofurane, and reprecipitating them by adding water to the solution. By choosing a suitable quantity of the naphthoquinone-(1,2)-diazide-sulfochloride in question and of the acid-binding agent used, one or more of the hydroxyl groups present may be esterified.

For the preparation of the reproduction layers the naphthoquinone-(1,2)-diazide-sulfoesters containing hydroxyl groups are dissolved in organic solvents, such as ethylene glycol monomethylether, ethyleneglycol monoethylether, dioxane, dimethyl formamide or a ketone, and then coated in a manner known per se on to suitable supports, such as metal plates or foils made up of aluminum, zinc or copper, or of several metal layers, paper or glass. On these reproduction layers copies of an original are produced by exposing the material to light through a master, then the layers are transformed into printing plates by development, preferably with dilute alkalies, i.e. alkaline reacting salts, such as trisodium phosphate or disodium phosphate. Alkali soluble resins may also be incorporated into the reproduction layers, which in general leads to an improved homogeneity of the coating and better adhesion of the image to the support. Such alkali soluble resins are natural resins, such as shellac or colophony, and synthetic resins, such as co-polymers of styrene and maleic anhydride, and especially low molecular weight condensation products of phenols with formaldehyde, the so-called "novolaks."

The amount of the alkali soluble resins to be added to the light sensitive diazo esters described above may vary widely. For the production of planographic printing plates lower concentrations of resins are used, i.e. from about 0.1 to about 1.0 part, preferably 0.3 to 0.8 part by weight of resin to 1.0 part by weight of ester. If plates are required which can withstand the acid etching agents used in etching machines, for example for the preparation of half-tone blocks, higher resin concentrations are used, i.e. from about 1.0 to about 6.0 parts, preferably from about 2.0 to about 4.0 parts by weight of the resin to 1.0 part of the above diazo esters.

The above described esters may be used in admixture with each other or with other light sensitive substances.

Printing plates prepared from naphthoquinone-(1,2)-diazide-(2)-sulfoesters in accordance with the present invention are superior to printing plates containing the esters hitherto used in that they are more easily developed and possess improved thermal stability, which results in an improvement of the shelf life of these printing plates in the unexposed state, even under adverse conditions.

Exemplary of the light-sensitive compounds which may be used in accordance with the present invention are the following:

FORMULA 1

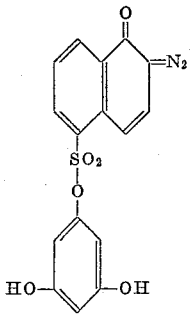

FORMULA 2

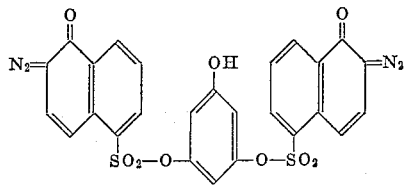

FORMULA 3

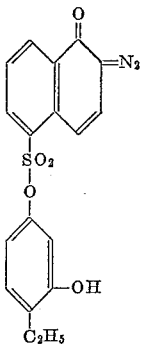

FORMULA 4

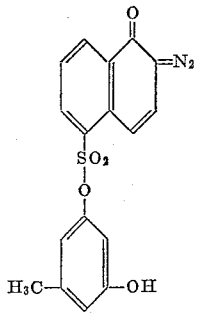

FORMULA 5

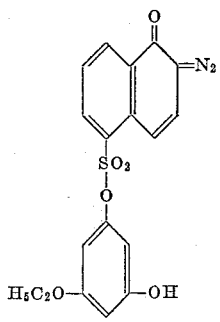

FORMULA 6

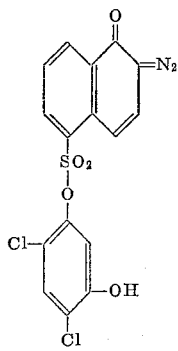

The invention will be further illustrated by reference to the following specific examples in which 1 ml. equals 1 part by volume when 1 g. is taken as 1 part by weight:

*Example I*

1.5 parts by weight of the compound corresponding to Formula 1 are dissolved in 100 parts by volume of ethyleneglycol monomethylether and a mechanically roughened aluminum foil lying on a rotating disc is coated with this solution. The foil is dried, first with a current of warm air and then, for about two minutes, at a temperature of 100° C. The sensitized foil is then exposed under a master, using e.g., a closed carbon arc lamp of 18 amps at a distance of about 70 cm. for a period of about 1 minute. For development of the image thus produced in the coated layer the exposed side of the foil is treated with a cotton pad soaked in a 5 percent disodium phosphate solution. A yellow image becomes visible against a metallic background. The developed foil is rinsed with water and then wiped over with an about 1 percent phosphoric acid solution in order to improve the hydrophilic properties of the support in the exposed areas. After inking with greasy ink the printing plate thus obtained may be set up in a printing machine and copies can be made therefrom which correspond to the original used.

The diazo compound corresponding to Formula 1 is prepared as follows:

12.6 parts by weight of phloroglucinol and 27 parts by weight of naphthoquinone-(1,2)-diazide-(2)-sulfochloride-(5) are dissolved in 200 parts by volume of dioxane. While agitating and at room temperature as much of a saturated sodium bicarbonate solution is slowly added as to render the solution weakly alkaline. In order to complete the reaction the reaction mixture is further agitated for about 30 minutes. The 1-(naphthoquinone-(1,2) - diazide - (2) - sulfonyloxy - (5)) - dihydroxy-(3,5)-benzene thus formed precipitates as a brown oil which is digested in 1000 parts by volume of ice water which had been acidified by means of dilute hydrochloric acid, and thus becomes solid. The monoester is filtered by suction, dissolved in dioxane, and reprecipitated by adding water to the solution. It is a light brown finely crystalline substance which begins to melt at about 350° C. while slowly darkening. The compound is easily soluble in ethyleneglycol monomethylether and dioxane, but difficultly soluble in methanol and ethanol.

*Example II*

1.5 parts by weight of the compound corresponding to Formula 2 are dissolved in 100 parts by volume of ethyleneglycol monomethylether, and this solution is used for coating a mechanically roughened aluminum foil lying on a rotating disc. The foil is dried, first by means of a current of warm air and then for about two minutes at 100° C. The thus sensitized foil is exposed under an original for about one minute, using, e.g. a closed carbon arc lamp of 18 amps at a distance of 70 cm. For development of the latent image thus produced, the exposed side of the foil is wiped over with a cotton pad soaked in a 5 percent disodium phosphate solution. A yellow image of the original appears on a metallic background. The image side of the foil is rinsed with water, wiped over with a cotton pad soaked in about 1 percent phosphoric acid, and then inked with greasy ink. The printing plate thus obtained can be used for making copies in a printing apparatus.

The diazo compound corresponding to Formula 2 is prepared as follows:

6.3 parts by weight of phloroglucinol and 27 parts by weight of naphthoquinone - (1,2) - diazide-(2)-sulfochloride-(5) are dissolved in 170 parts by volume of dioxane. While agitating and at room temperature, sufficient saturated sodium bicarbonate solution is added to render the solution weakly alkaline. Thereafter, the reaction mixture is agitated for another 30 minutes in order to complete the reaction. The bis-ester thus formed precipitates as a brown oil which is digested in 1000 parts by volume of ice water which had been acidified by means of dilute hydrochloric acid. By this treatment the bisester becomes solid. The reaction product is drawn off, dissolved in dioxane, and reprecipitated by adding water to the solution. The purified 1,3-bis-(naphthoquinone-(1,2)-diazide - (2) - sulfonyloxy-(5))-hydroxy-5-benzene thus obtained is a light brown crystalline substance which begins to melt at about 350° C. while slowly turning dark. It is easily soluble in ethyleneglycol monomethylether and dioxane, but difficultly soluble in methanol and ethanol.

*Example III*

By analogy to the method described in Example I, a solution containing 1.5 parts by weight of the compound corresponding to Formula 3 dissolved in 100 parts by volume of ethylene glycol monomethylether is coated onto a mechanically roughened aluminum foil, dried, and the sensitized foil is then similarly exposed and developed with a 5 percent disodium phosphate solution. After development, the foil is briefly wiped over with an about 1 percent phosphoric acid solution and then inked with greasy ink. The printing plate thus obtained corresponds to the original used.

The diazo compound corresponding to Formula 3 is prepared analogously to the diazo compound corresponding to Formula 1, e.g.:

27 parts by weight of naphthoquinone-(1,2)-diazide-(2)-sulfochloride-(5) and 13.8 parts by weight of 4-ethylresorcinol are dissolved in 200 parts by volume of dioxane. A saturated sodium bicarbonate solution is added as the acid-binding agent, and the reaction mixture is then agitated for another 30 minutes. Further treatment of the oily raw product is similar to the procedure of Example I. After recrystallization from a mixture of benzene and petroleum ether, the 1-(naphthoquinone-(1,2)-diazide-(2)-sulfonyloxy - (5)) - hydroxy-(3)-ethyl-(4)-benzene is obtained in the form of an orange colored crystalline substance which melts at 72–75° C. It is easily soluble in ethyleneglycol monomethylether, dioxane and acetone, and soluble in warm ethanol.

Equally good results are obtained when using, instead of the compound corresponding to Formula 3, one of the compounds corresponding to Formulae 4, 5 or 6.

The diazo compound corresponding to Formula 4 is prepared as follows:

12.4 parts by weight of 1,3-dihydroxy-(5)-methyl-benzene and 29.0 parts by weight of naphthoquinone-(1,2)-diazide-(2)-sulfochloride-(5) are dissolved in 180 parts by volume of dioxane. While agitating and at room temperature, a ten percent sodium carbonate solution is slowly added until the reaction mixture has become neutral. In order to complete the reaction the reaction mixture is further agitated for one hour. Thereafter the monoester separates in the form of an orange-brown oil which is decanted. The substance thus obtained is repeatedly washed with water and thus becomes solid. After recrystallization from ethyleneglycol monomethylether, the 1-(naphthaquinone - (1,2) - diazide-(2)-sulfonyloxy-(5)) forms an orange compound which melts at 142–144° C. with decomposition. The monoester is easily soluble in ethyleneglycol monomethylether, difficultly soluble in methanol, and insoluble in alkalis.

For the preparation of the compound corresponding to Formula 5, 15.4 parts by weight of phloroglucinol monoethylether and 27.0 parts by weight of naphthoquinone-(1,2)-diazide-(2)-sulfochloride-(5) are dissolved in 300 parts by volumes of dioxane. Saturated sodium bicarbonate solution is cautiously added, with stirring and at room temperature, until a weakly alkaline reaction is obtained. For completion of the reaction, stirring is continued for about 30 minutes. The mono-ester precipitates in the form of a semi-solid product which solidifies upon digestion with 1000 parts by volume of ice water to which about 40 parts by volume of hydrochloric acid (1:1) have been added. The 1-(naphthoquinone-(1,2)-diazide-(2)-sulfonyloxy-(5))-hydroxy-(3)-ethoxy - (5) - benzene thus obtained is purified by reprecipitation from dioxane/water. It is obtained in the form of a canary-yellow, finely crystalline substance which melts at 113–115° C. with decomposition. The mono-etser dissolves easily in dioxane, ethyleneglycol monomethyl ether, and acetone, and only sparingly in methanol and ethanol.

The diazo compound corresponding to Formula 6 is prepared as follows:

17.9 parts by weight of 1,3-dihydroxy-(4,6)-dichlorobenzene and 29.0 parts by weight of naphthoquinone-(1,2)-diazide-(2)-sulfochloride-(5) are dissolved in 180 parts by volume of dioxane. While agitating and at room temperature, sufficient 10 percent sodium bicarbonate solution is slowly added to render the reaction mixture neutral. It is then further agitated for one hour to complete the reaction. The monoester precipitates as a crystalline substance which melts at 141–142° C. under decomposition. The 1-(naphthoquinone - (1,2) - diazide-(2)-sulfonyloxy-(5))-hydroxy-(3)-dichloro-(4,6)-benzene is soluble in dimethylformamide, only difficultly soluble in ethyleneglycol monomethylether or methanol, and insoluble in alkalies.

*Example IV*

2.5 parts by weight of 1-[naphthoquinone - (1,2) - diazide-(2)-sulphonyloxy-(5)]-dihydroxy-(3,5) - benzene corresponding to Formula 1, and 7.5 parts by weight of a m-cresol-formaldehyde resin novolak of the softening point 108–118° C. and the color "normalhell-dunkel" are dissolved in 100 parts by volume of ethylene-glycol monomethylether. 0.3 part by weight of castor oil and 0.5 part by weight of "Methyl Violet BB" are added, the solution is filtered and then coated onto a polished zinc-plate. The layer is then dried by means of warm air. For the preparation of a cliché, the layer side of the zinc-plate is exposed through a diapositive. The exposed layer side which now carries the latent image is treated with a cotton pad soaked with an about 2.5% trisodiumphosphate solution, containing also 10–15% (by volume) of ethyleneglycol monomethylether. Thus the layer parts struck by light are removed from the surface of the zinc-plate, and an image corresponding to the master used remains on the metallic base material. After rinsing with water the plate is placed with its layer side on an earthenware trough, which is provided with vane wheels, which centrifuge dilute (7–8%) nitric acid against the plate. Etching is performed either by the usual process in several steps or according to the 1-step-process. Without heating the zinc-plate before etching there is obtained a cliché being especially suited for book- and illustration-printing.

*Example V*

In 100 parts by volume of ethyleneglycol monomethylether there are dissolved 2 parts by weight of 1,3-bis-[naphthoquinone-(1,2)-diazide-(2)-sulphonyloxy - (5)]-hydroxy-(5)-benzene corresponding to Formula 2 and 6 parts by weight of a m-cresol-formaldehyde-resin novolak with the qualities described in Example IV. 0.3 part by weight of maize-oil and 0.5 part by weight rosaniline-hydrochloride are added, then the solution is filtered and coated onto a polished copper plate. After exposure under a photographic negative the layer is treated with a cotton pad soaked with an about 2.5% trisodiumphosphate solution, containing also 10–15% (by volume) of ethyleneglycol monomethylether. Thereby the light-struck parts of the layer are removed from the metallic carrier. The copper plate carrying parts of the layer according to the master is now etched at 20–22° C. by means of an iron chloride solution of 40° Bé.

The light-sensitive solution is also suitable for directly coating rotating copper cylinders, one or more spray nozzles being used.

It will be obvious to those skilled in the art that many modifications may be made within the scope of the present invention without departing from the spirit thereof, and the invention includes all such modifications.

What is claimed is:

1. A compound having the formula

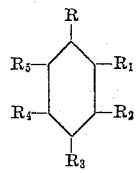

in which the substituents R, $R_1$, $R_2$, $R_3$, $R_4$, and $R_5$ are selected from the group consisting of hydrogen, hydroxyl, halogen, alkyl, alkoxy and naphthoquinone-1,2-diazide sulfonyloxy groups, at least one of the substituents being a naphthoquinone-1,2-diazide sulfonyloxy group and at least one substituent being hydroxyl.

2. A compound having the formula

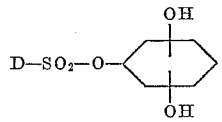

in which D is a naphthoquinone-(1,2)-diazide group.

3. A compound having the formula

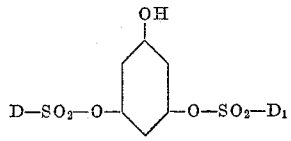

in which D and $D_1$ are naphthoquinone-(1,2)-diazide groups.

4. A compound having the formula

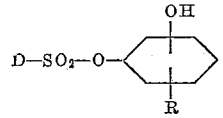

in which D is a naphthoquinone-(1,2)-diazide group and R is an alkyl group.

5. A compound having the formula

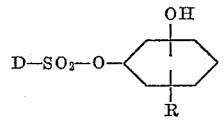

in which D is a naphthoquinone-(1,2)-diazide group and R is an alkoxy group.

6. A compound having the formula

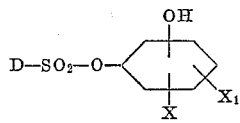

in which D is a naphthoquinone-(1,2)-diazide group and X and $X_1$ are selected from the group consisting of hydrogen and halogen, at least one of X and $X_1$ being halogen.

7. A compound having the formula

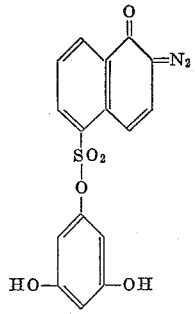

8. A compound having the formula

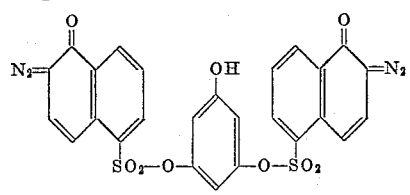

9. A compound having the formula

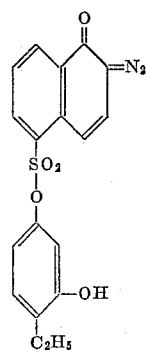

10. A compound having the formula

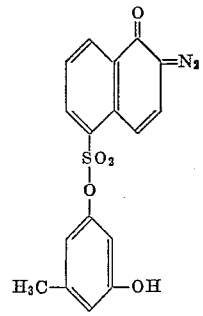

11. A compound having the formula

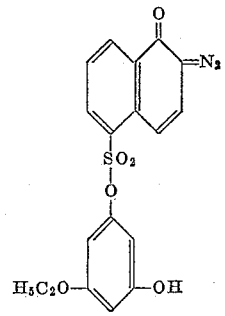

12. A compound having the formula

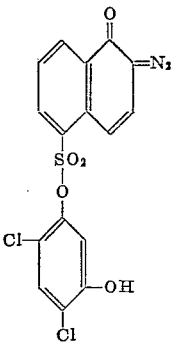

13. A presensitized printing plate comprising a base material having a coating thereon, the coating comprising a compound having the formula

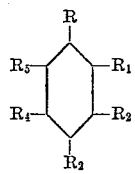

in which the substituents R, $R_1$, $R_2$, $R_3$, $R_4$, and $R_5$ are selected from the group consisting of hydrogen, hydroxyl, halogen, alkyl, alkoxy and naphthoquinone-1,2-diazide sulfonyloxy groups, at least one of the substituents being a naphthoquinone-1,2-diazide sulfonyloxy group and at least one substituent being hydroxyl.

14. A presensitized printing plate comprising a base material having a coating thereon, the coating comprising a compound having the formula

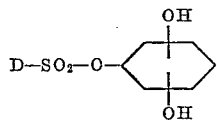

in which D is a naphthoquinone-(1,2)-diazide group.

15. A presensitized printing plate comprising a base material having a coating thereon, the coating comprising a compound having the formula

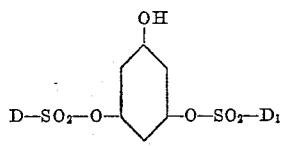

in which D and $D_1$ are naphthoquinone-(1,2)-diazide groups.

16. A presensitized printing plate comprising a base material having a coating thereon, the coating comprising a compound having the formula

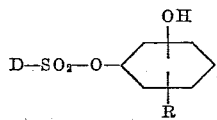

in which D is a naphthoquinone-(1,2)-diazide group and R is an alkyl group.

17. A presensitized printing plate comprising a base material having a coating thereon, the coating comprising a compound having the formula

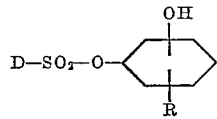

in which D is a naphthoquinone-(1,2)-diazide group and R is an alkoxy group.

18. A presensitized printing plate comprising a base material having a coating thereon, the coating comprising a compound having the formula

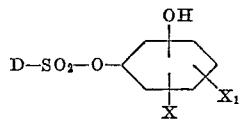

in which D is a naphthoquinone-(1,2)-diazide group and X and $X_1$ are selected from the group consisting of hydrogen and halogen, at least one of X and $X_1$ being halogen.

19. A presensitized printing plate comprising a base material having a coating thereon, the coating comprising a compound having the formula

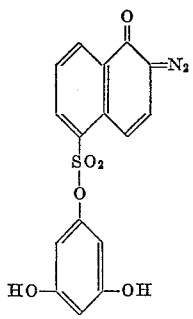

20. A presensitized printing plate comprising a base material having a coating thereon, the coating comprising a compound having the formula

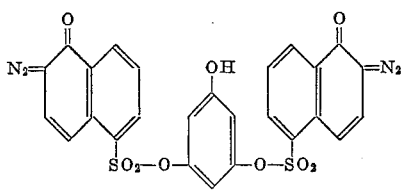

21. A presensitized printing plate comprising a base material having a coating thereon, the coating comprising a compound having the formula

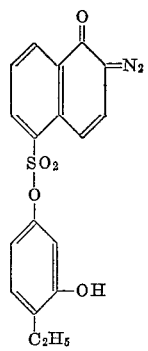

22. A presensitized printing plate comprising a base material having a coating thereon, the coating comprising a compound having the formula

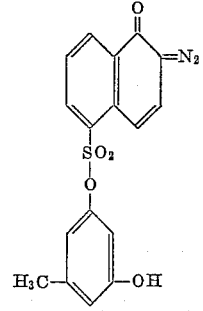

23. A presensitized printing plate comprising a base material having a coating thereon, the coating comprising a compound having the formula

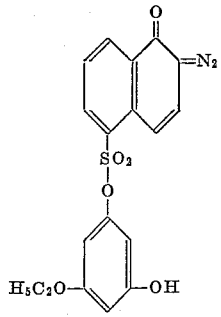

24. A presensitized printing plate comprising a base material having a coating thereon, the coating comprising a compound having the formula

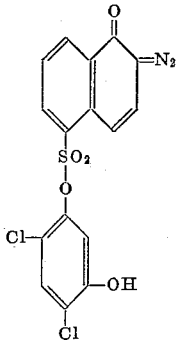

25. A process for making a printing plate which comprises exposing a coated base material to light under a master, the coating comprising a compound having the formula

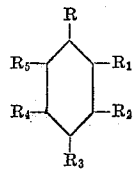

in which the substitutents R, $R_1$, $R_2$, $R_3$, $R_4$, and $R_5$ are selected from the group consisting of hydrogen, hydroxyl, halogen, alkyl, alkoxy and naphthoquinone-1,2-diazide sulfonyloxy groups, at least one of the substituents being a naphthoquinone-1,2-diazide sulfonyloxy group and at least one substituent being hydroxyl, and treating the exposed coating with a developing solution.

26. A process for making a printing plate which comprises exposing a coated base material to light under a master, the coating comprising a compound having the formula

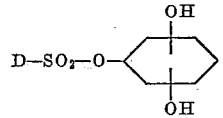

in which D is a naphthoquinone-(1,2)-diazide group, and treating the exposed coating with a developing solution.

27. A process for making a printing plate which comprises exposing a coated base material to light under a master, the coating comprising a compound having the formula

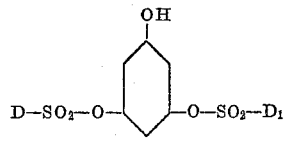

in which D and $D_1$ are naphthoquinone-(1,2)-diazide groups, and treating the exposed coating with a developing solution.

28. A process for making a printing plate which comprises exposing a coated base material to light under a master, the coating comprising a compound having the formula

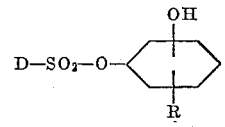

in which D is a naphthoquinone-(1,2)-diazide group and R is an alkyl group, and treating the exposed coating with a developing solution.

29. A process for making a printing plate which comprises exposing a coated base material to light under a master, the coating comprising a compound having the formula

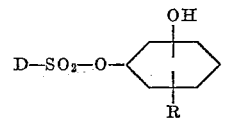

in which D is a naphthoquinone-(1,2)-diazide group and R is an alkoxy group, and treating the exposed coating with a developing solution.

30. A process for making a printing plate which comprises exposing a coated base material to light under a master, the coating comprising a compound having the formula

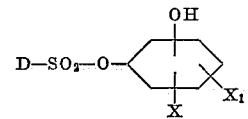

in which D is a naphthoquinone-(1,2)-diazide group and X and $X_1$ are selected from the group consisting of hydrogen and halogen, at least one of X and $X_1$ being halogen, and treating the exposed coating with a developing solution.

31. A process for making a printing plate which comprises exposing a coated base material to light under a master, the coating comprising a compound having the formula

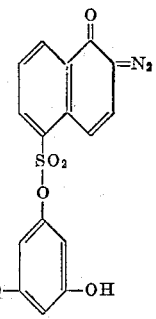

and treating the exposed coating with a developing solution.

32. A process for making a printing plate which comprises exposing a coated base material to light under a master, the coating comprising a compound having the formula

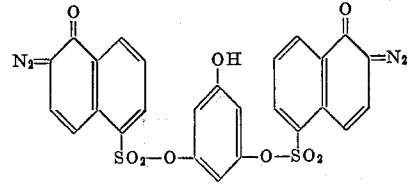

and treating the exposed coating with a developing solution.

33. A process for making a printing plate which comprises exposing a coated base material to light under a master, the coating comprising a compound having the formula

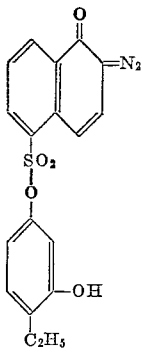

and treating the exposed coating with a developing solution.

34. A process for making a printing plate which comprises exposing a coated base material to light under a master, the coating comprising a compound having the formula

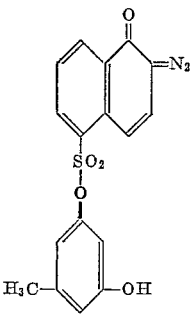

and treating the exposed coating with a developing solution.

35. A process for making a printing plate which comprises exposing a coated base material to light under a master, the coating comprising a compound having the formula

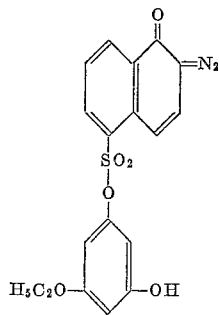

and treating the exposed coating with a developing solution.

36. A process for making a printing plate which comprises exposing a coated base material to light under a master, the coating comprising a compound having the formula

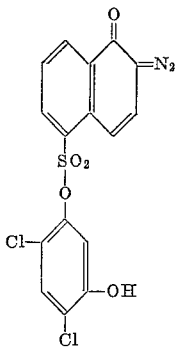

and treating the exposed coating with a developing solution.

References Cited in the file of this patent
UNITED STATES PATENTS 2,138,809   Reiff et al. _____ Nov. 29, 1938

FOREIGN PATENTS 706,028   Great Britain _____ Mar. 24, 1954
737,379   Great Britain _____ Sept. 28, 1955
739,654   Great Britain _____ Nov. 2, 1955
922,506   Germany _____ Jan. 17, 1955